Oct. 6, 1970 R. C. CLARK 3,532,887
MEASURING BY MEANS OF THE INFRARED EMISSION THEREFROM
THE LENGTH OF A MOVING HOT METAL SLAB
Filed Oct. 2, 1968 12 Sheets-Sheet 1

INVENTOR.
ROBERT C. CLARK

# United States Patent Office 3,532,887
Patented Oct. 6, 1970

3,532,887
MEASURING BY MEANS OF THE INFRARED EMISSION THEREFROM THE LENGTH OF A MOVING HOT METAL SLAB
Robert C. Clark, Roanoke, Va., assignor to General Electric Company, a corporation of New York
Filed Oct. 2, 1968, Ser. No. 764,509
Int. Cl. G01n 21/30
U.S. Cl. 250—83.3                                                     10 Claims

ABSTRACT OF THE DISCLOSURE

An apparatus for measuring the length of a hot metal slab being processed in a rolling mill, including a polygonal drum with peripheral mirrors which rotate at a uniform rate on an axis perpendicular to the path of the hot metal slab, whereby the peripheral mirrors scan the length of the metal and project the scanned view to an infrared sensor which is connected to a circuit linearizing the angular displacement of the scan by dividing equiangular segments of the scan projected onto a flat surface of the metal into a series of equilength increments which are then accumulated in a counter after being properly scaled for slab thickness to establish a dimensional value of the hot metal slab.

BACKGROUND OF THE INVENTION

The present invention relates to measuring and more particularly to a noncontacting dimension gage for the measurement of the length or width of a moving slab of hot metal in a rolling mill. During the manufacture of slabs it is very often necessary to rotate the metal slab 90° whereby what was previously the length of the slab becomes the width, a process generally called broadside rolling. To assure that the rotated slab length does not exceed the capacity of the mill, the length measurement of the slab before rotating is necessary, and to assure that the slab length will produce the desired plate width, with no more waste than is required to allow for predictable shrinkage (from cooling) and edge imperfection. Since the slab length changes with processing, a length measuring device must be adapted to provide substantially uninterrupted monitoring of the process. With the advent of computers and data logging, greater accuracy in measurement, and greater speed of processing, more sophisticated equipment for obtaining measurements have become essential. It is necessary that a measurement gaging device be of rugged construction to assure reliable operation under the adverse conditions normally existing in rolling mills. While simple contacting dimension gages exist such gages are considered to be slow and very often inaccurate and are subject to damage by heat from the hot metal being processed. To overcome the problems of contacting gages noncontacting dimension gages were developed. One such noncontacting length gage uses a series of function plates each consisting of a stainless steel plate having engraved therein a series of lines which converge on one point. The photocells placed in such manner as to receive a reflected beam of light from a light source from the surface of the stainless steel produces a signal which is interrupted by the passage of the engraved converging line on the stainless steel plates. Stainless steel plates themselves are mounted on a rotating drum and upon rotation the photocell produces pulsed signals which when scaled properly by traverse motion of the photocell provide an indication of metal dimension by accumulating the number of pulses in a counter. The positioning of the plates on a rotating drum requires mechanical adjustment and calibration of the highest degree of accuracy. The surface of the plates must provide reflectivity adequate for the proper operation of the photocell, a process which requires close tolerances in the manufacture thereof.

SUMMARY OF THE INVENTION

The present invention reduces these requirements by the use of logic circuitry in a noncontacting dimension gage. The gage includes a scanning means which reflects infrared rays to a photocell responsive to the infrared radiation of the object to be measured for producing an electrical signal. Circuit means produces a pulsed output linearized by a digital function generating means whereby the electrical signal produced by the scanning means is divided in dimensionally equal increments per degree of scan angle. The resultant electrical pulses are then accumulated in a counter as a function of the dimension of the hot metal being measured.

DESCRIPTION OF THE DRAWINGS

While the specification concludes with claims particularly pointing out and distinctly claiming that which is regarded as the present invention, the details of one embodiment of the invention along with further objects and advantages may be more readily ascertained from the following detailed description when read in conjunction with the accompanying drawings in which:

DETAILED DESCRIPTION

Figure 1:
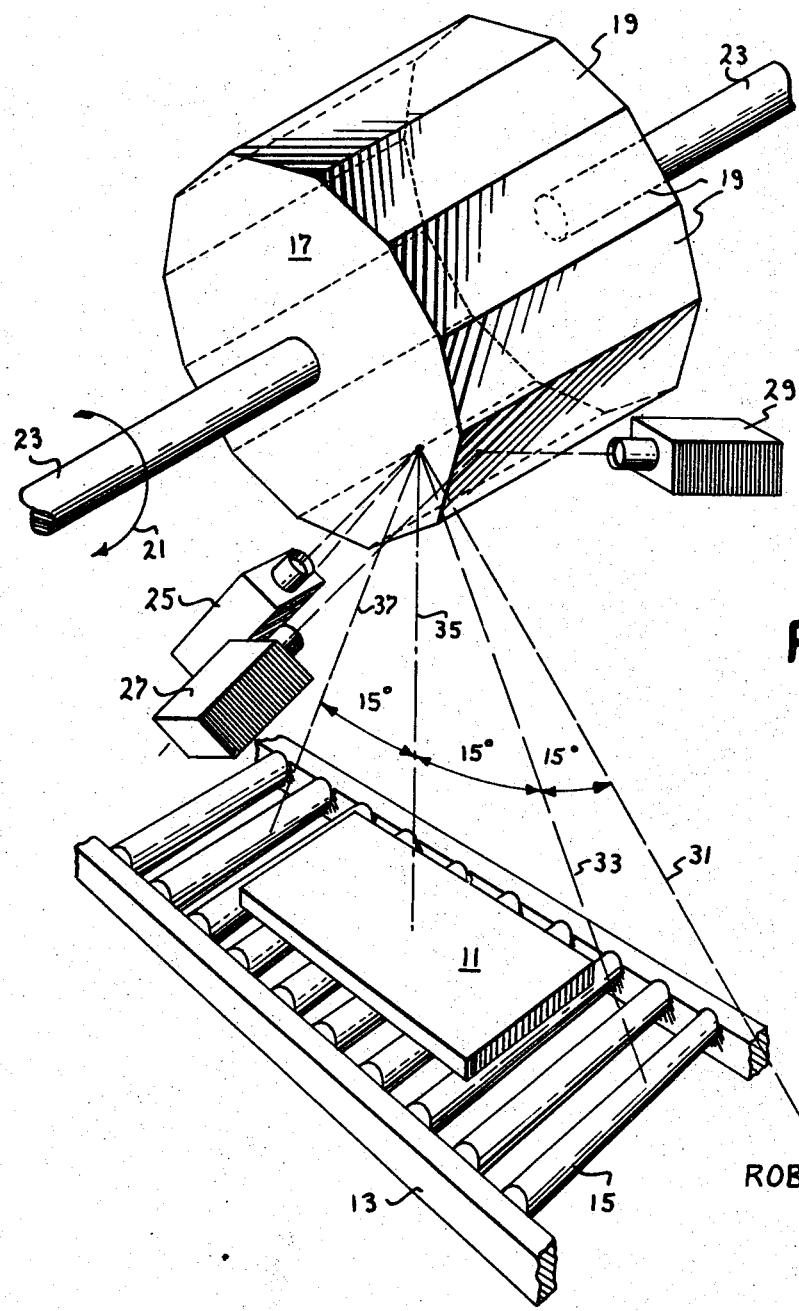
FIG. 1 is a simplified view of the general arrangement of the dimensional gage scanning means including representations of certain of the physical components.

FIG. 1 includes an oblique view of a hot metal slab 11 undergoing processing in a hot metal rolling mill. In this mill a noncontacting length gage is located over a runout table 13 having supporting rolls 15. A rotating polygonal drum 17 having a plurality of peripherally located mirrors or facets such as 19 is driven in a clockwise rotation indicated by arrow 21 on shaft 23 by a motor (not shown). In a length gage the axis of rotation of drum 17 is perpendicular to the movement of slab 11 so that the changing position of each facet with reference to the runout table 13 causes the facet to scan or sweep the slab 11 positioned thereon from end to end along its length. In a width gage the axis of drum 17 would be in the direction of the motion of the slab. The field of view, reflected by the orbiting facets 19 to a light sensor 25, contains an angular dimension of 15° on either side of the vertical center line to the drum. This is accomplished in only 7.5° of shaft rotation each side of the center line. Sensor 25 is sensitive to the infrared radiation produced by the heated metal slab 11, hence will detect the presence of hot metal during the passage of each sweep, when the metal is within range of the scanner on the runout table 13 and will produce an electrical signal accordingly. A second light sensor 27 is activated by a light beam from a light source 29 which is reflected from facets 19 when each of the facets reaches a predetermined position in the orbital path around shaft 23, which results in the light sensor 27 producing a pulse which occurs 15° before the occurrence of a scan through the field of view of light sensor 25. In other words, as shown in FIG. 1 when the radiation from the hot slab 11 is reflected in the direction along line 31, a pulse is produced by light sensor 27 due to light being reflected from light source 29 from the appropriate facet 19 of drum 17. As the drum rotates and a 15° sweep has been completed, a point along line 33 will initiate the "see hot metal" portion of the scan circle. Continuing for another 15° the sweep will reach the perpendicular center line 35 of the scan cycle. Another 15° produces the farthest limit for viewing by the light sensor 25 of any radiation which may be produced by a hot metal slab 11, present on the runout table within range. Fifteen degrees more of sweep will occur before another pulse is produced by light sensor 27 due to the reflection of light from light source 29 from a subsequent facet 19 of drum 17 whereby another scan sweep is initiated. Four 15° increments thus form a scan sweep of which two are of primary importance by being the "visible" scan angle.

Figure 2:
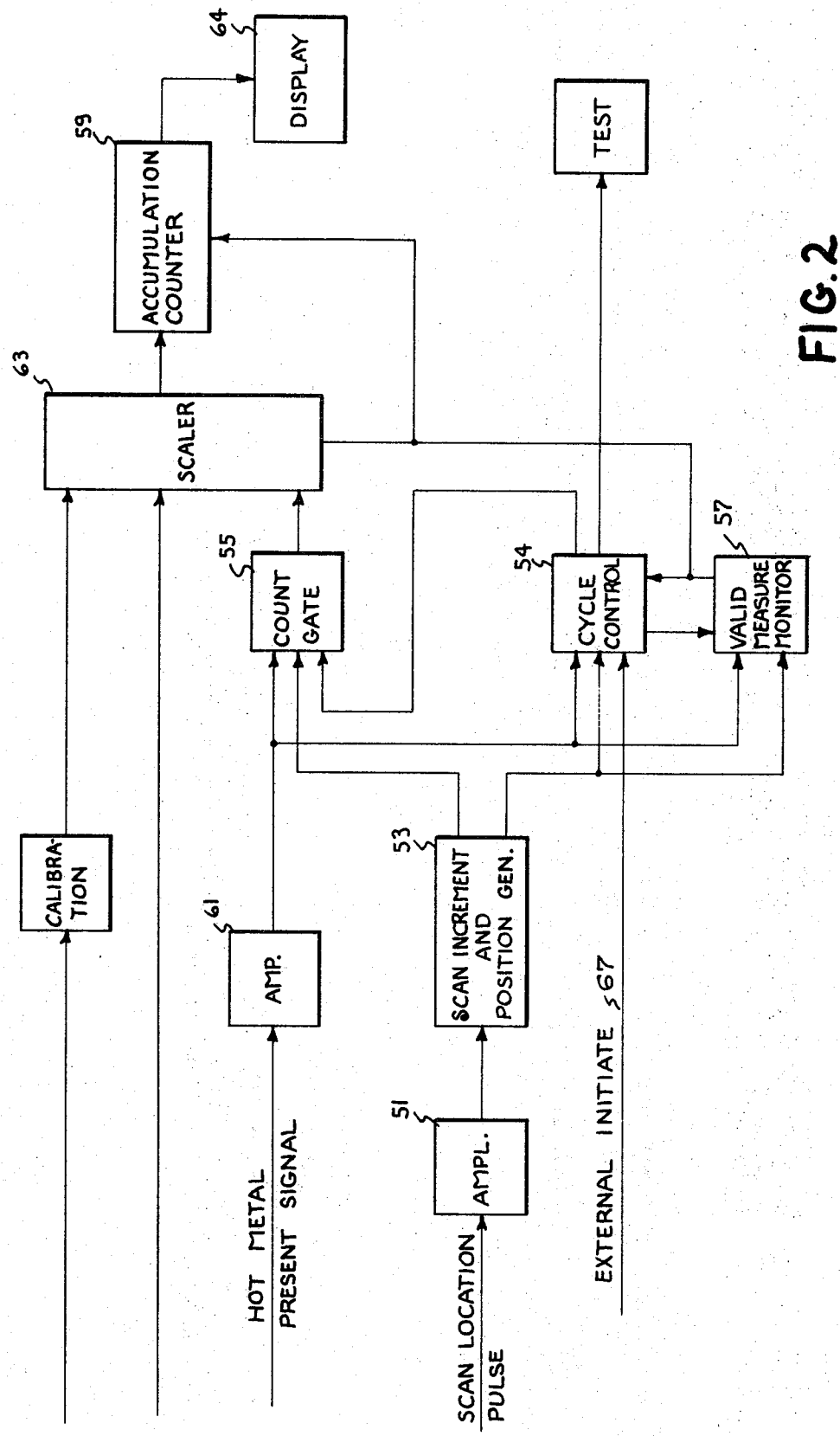
FIG. 2 is a block diagram showing the basic functions required for the operation of a noncontacting measuring gage.
Figure 3:
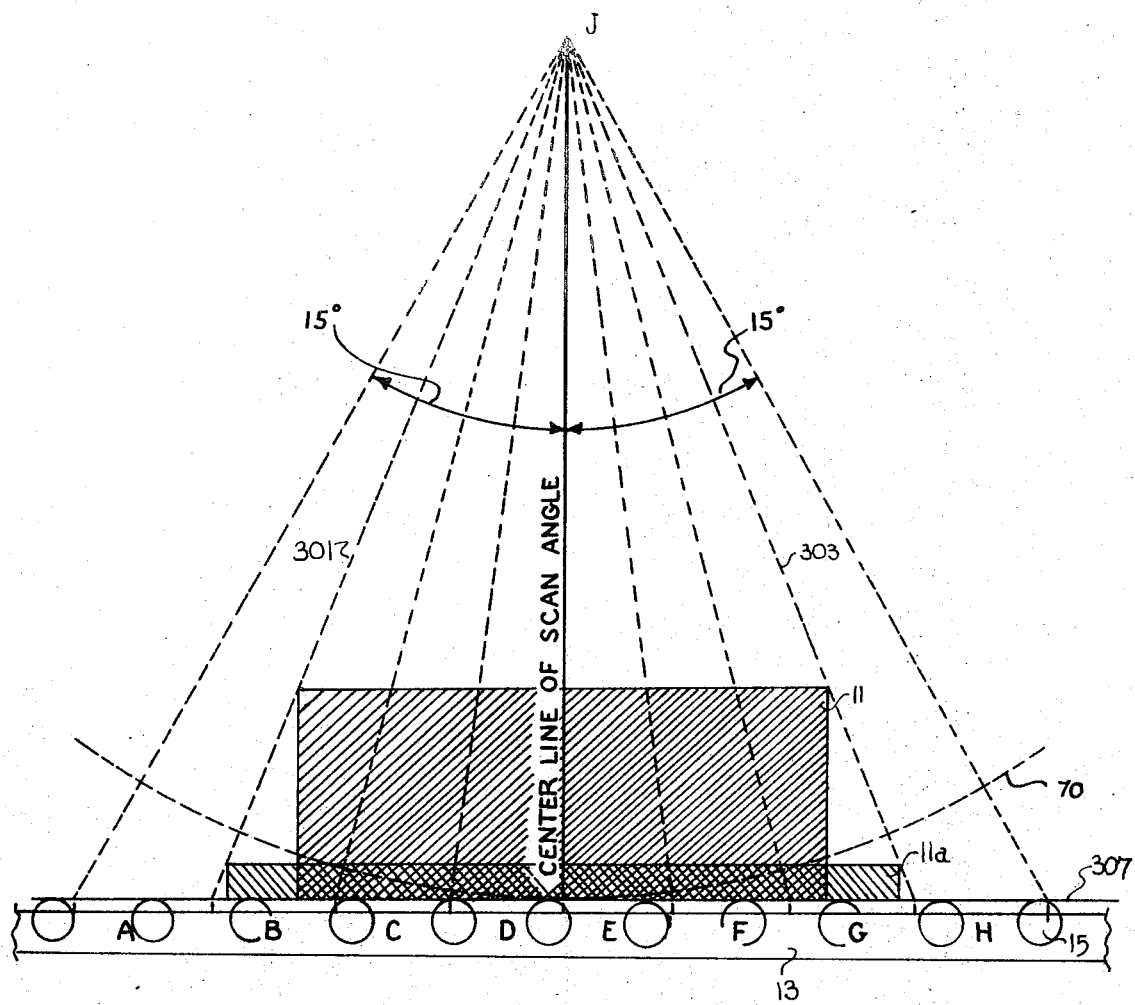
FIG. 3 is an exaggerated view of the scanning cycle to show the difference of incremental lengths of the projected scan equiangular increments.

Referring now to FIG. 2 the scan location pulse derived from light sensor 27 is amplified by amplifier 51 and applied to the scan increment and position generator 53 which in turn applies the pulse to the cycle control 54 and the valid measure monitor 57. The scan increment and position generator 53 contains a variable oscillator which produces pulses and applies these to the count gate 55. The pulses thus produced are used to divide the scan sweep produced by the reflected image of the hot metal into a series of increments and as a result thereof must be synchronized with the scan sweep of the drum. The scan location pulse is used for this purpose. The total number of pulses are ultimately accumulated in a counter within the scan increment and position generator 53. When this counter is full, that is when the last bit of the counter changes state, a pulse is produced and its timely occurrence compared with the occurrence of the scan location pulse derived from light sensor 29 through amplifier 51. The oscillator in the scan increment and position generator is fast when the counter fills before the scan location pulse occurs, and will be inhibited by the cycle control 54. However, if the scan location pulse occurs first then the oscillator is slow and a speedup signal produced by the cycle control will cause the variable oscillator to increase its output frequency. As soon as hot metal is detected within range of the "see hot metal" scan angle enclosed by lines 33 and 37 in FIG. 1, hot metal radiations will be reflected from the scan mirrors 19 into the lens of light sensor 25, which as a result thereof produces a hot metal present signal. This signal is amplified by amplifier 61 and applied to the count gate 55, the cycle control 54 and the valid measure monitor 57. An external initiate signal derived from a pushbutton closure initiated by the operator, or a signal derived from a computer or equivalent is applied to the cycle control 54 which in addition to the scan location pulse produced by the scan increment and position generator 53 and the hot metal present signal from amplifier 61 will cause the cycle control 54 to produce a binary ONE signal which is applied to the count gate 55. The count gate having applied thereto a binary ONE signal representing hot metal present and the pulses from the scan increment and position generator 53 and a binary ONE signal from the cycle control 54 will cause the count gate 55 to produce pulses which, when applied to the scaler circuit 63, will convert these pulses representing the length of the hot metal slab 11 present on the runout table 13 in FIG. 1 to a desired unit of length. The valid measure monitor 54 performs two functions when the hot metal present signal and the scan location pulse are applied thereto: 1. The valid measure monitor produces a signal and applies this to the cycle control when the hot metal is within range; that is, when the hot metal occupies a space within the 30° of visible "see hot metal" scan angle. 2. The valid measure monitor 57 causes the cycle control 54 to clear the counter and start recounting whenever hot metal is seen more than once in a scan cycle. In other words, if for some reason the radiation is interrupted during a scan the valid measure monitor will clear the counter 59 and recycle the length measurement. The cycle control 54, when a measurement is to be made, enables the counting of twelve consecutive scans or one revolution of the drum 17, thereby completing one cycle. This enabling signal from the cycle control 54 can also be started by the external initiate signal 67 or it will automatically be started in the measurement cycle control when the scan does not see hot metal for several scan cycles, in other words, when no hot metal signal is applied to the cycle control circuit 54 for several revolutions of the scan drum. Then the signal is repeated for several cycles. The valid measure monitor 57 looks for certain invalid measuring conditions: (1) The scanner sees hot metal beyond the scan range of 30° enclosed by lines 33 and 37 in FIG. 1; (2) The scanner does not see hot metal in the center of the scan that is along line 35 in FIG. 1; (3) The scanner sees hot metal for more than once in each scan cycle. If any of these conditions are sensed during a scan, the valid measure monitor will reset the measurement cycle control and the measurement circuitry, thus because of the operation of the valid measure monitor the scan cycle control will not complete a measurement until the scanner sees 12 consecutive valid scans. Once the measurement is complete, cycle control locks out the valid measurement monitor and closes the count gate until another measurement starts. The counter 59 accumulates the scaled pulses from the scaler 63 and at the end of a cycle, that is, 12 consecutive scans, the display unit 64 will display the contents of the accumulation counter 59. The linearization of the scan increments as generated by the rotating drum may be explained best with the use of FIG. 3 wherein the 30° range of the "see hot metal" portion of the scan is divided in eight equal segments A–H of the scan rotation. Each segment therefore covers 3.75° of the scan. The segments are projected onto a srtaight line target representing the upper surface of metal 11, which is the straight line tangent to the center of the scanned arc 70. On examining the projection in FIG. 3 it is obvious that the outer increments A and H must be larger than the center increments D and E for a scan divided into many small increments. The outer increments are approximately 1.07 times the size of the center increments. Thus, without some form of compensation the scan linearity would be at best about 3½% of the full scan width. The scan increment will therefore have to be linearized and with the use of the oscillator in the scan increment and position generator 53 through the count gate 55 the linear "see hot metal" scan is divided into 2048 increments or 1024 increments per each 15°. Since the basic clock period was selected to represent one linear increment at the outer edges of the "see hot metal" scan which is represented by sections A and H in FIG. 3, then the inner increments such as D and E would take something less than one pulse. In actuality the scan angle is divided in many more increments than shown in FIG. 3, so that as the scan moves from the outside edge of H toward the center 35, a clock pulse will be deleted from the increment output of the oscillator in the increment and position generator 53 each time the accumulated scan position is about ½ increment too large whereby on the next count the position will be about ½ count too small. The oversize increments will gradually bring the accumulated count back to ½ increment too large causing another pulse to be deleted. FIG. 3 shows that more pulses will need to be deleted near the center line of the scan than are necessary to be deleted when the scan approaches the outer edges.

Figure 4:
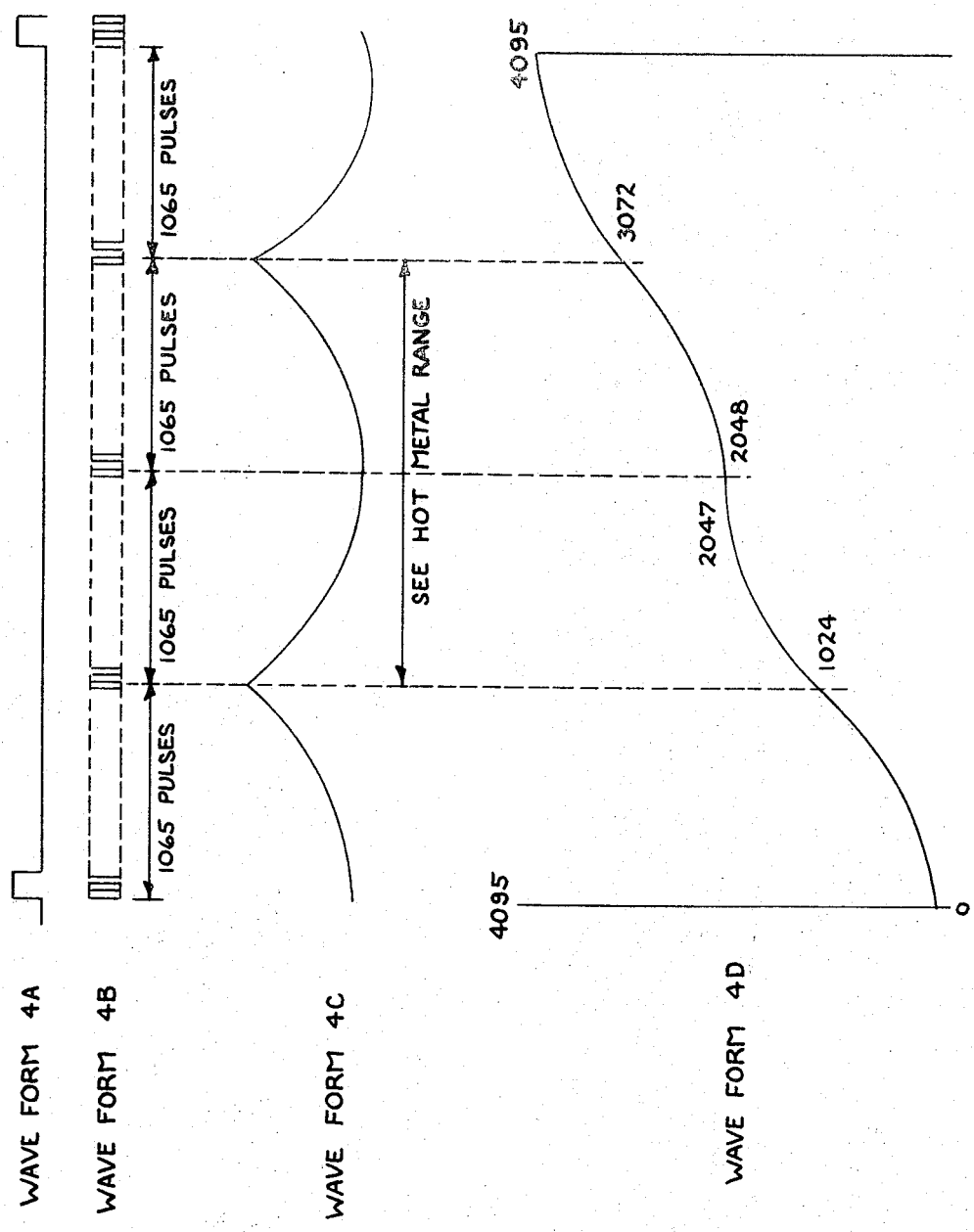
FIG. 4 is a waveform chart which verifies the characteristics of linearity compensation of scanning increments.

Referring now to FIG. 4 showing a series of waveforms representing the output of the various circuits and components in the length gage system. Waveform 4A is the locator pulse derived from the light sensor 29 and the output of amplifier 51. The waveform 4B represents the output from the oscillator in the scan increment and position generator 53 which as shown produces a total of 1065 pulses per 15° of scan, making a total of 4260 pulses per scan cycle. The linearizing or pulse deletion function is implemented on the basis of 15° of scan or 1024 counts of the position cycle. This pulse deletion is performed by a function generator in the increment and position generator which via a multiplex circuit deletes one clock pulse at each of 41 selected positions, an operation which will be described in greater detail later. The function generator accordingly will therefore supply 1024 increments for each 15° of scan. Waveform 4B represents the analog representation of the linearized position output from the function generator. At the left hand side, the function generator produces 1024 pulses in the first 15° and continues to supply pulses to the center of the "see hot metal" range at which time it will have produced 2048 pulses. Upon completing the entire 30° of "see hot metal" range, 3072 pulses have been produced and for the last 15° of scan the total of 4095 pulses are accumulated, whereupon a new cycle starts at the left hand side. Forty-one pulses are deleted from each of the 15° portions of the cycle.

For proper function of the length gage, however, the linearization of the scan increments must be symmetrical around the center line of the scan angle. The multiplexing circuit within the scan increment and position generator 53 provides the function of inverting the inputs to the accumulation counter which are shown by waveform 4C counts before modification by the function generator is derived from the multiplexing circuit output.

Figures 5, 6:
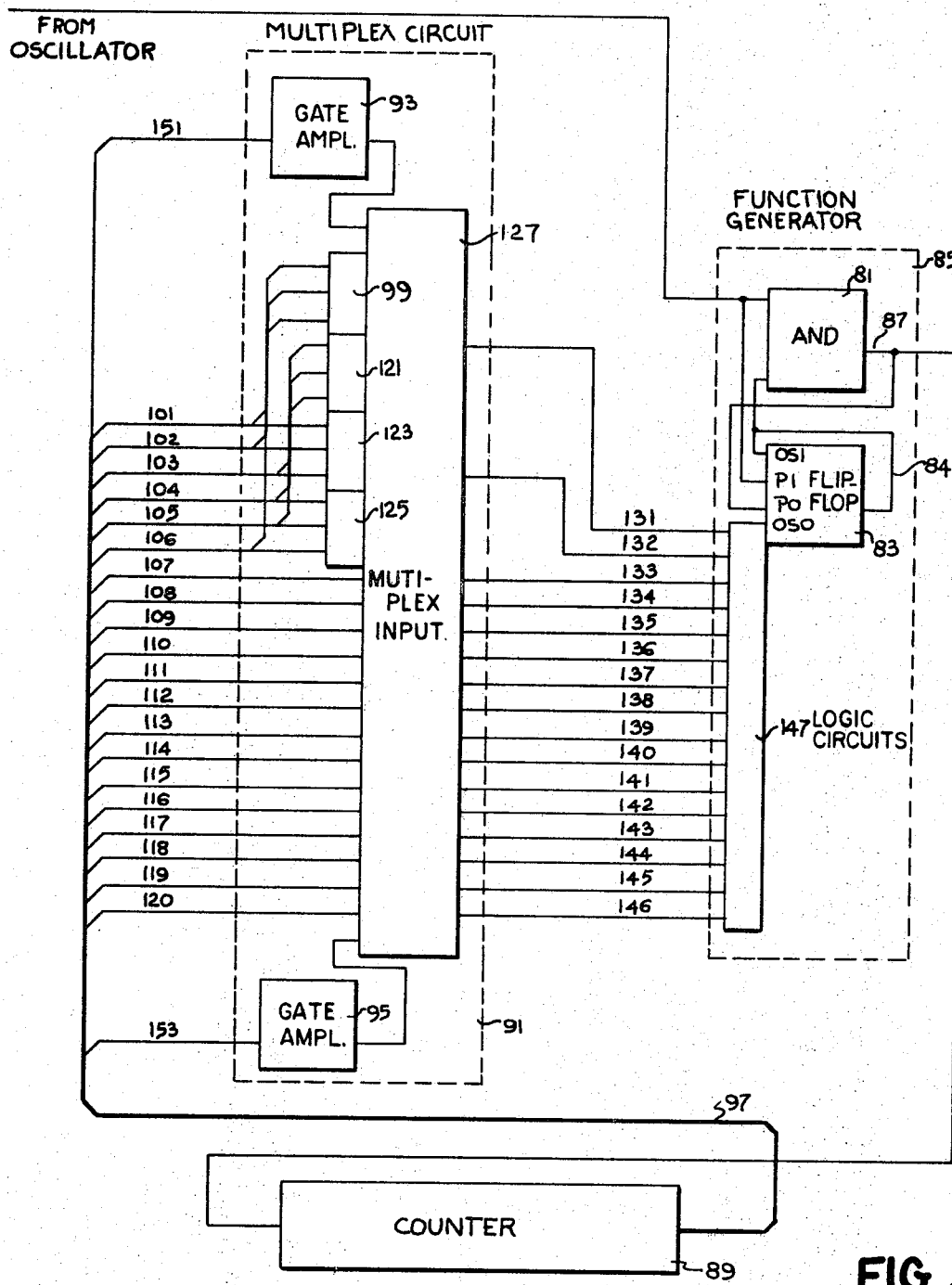
FIG. 5 is a block diagram of the linearization circuitry function for the production of the measurable pulsed output to a counter and display unit.
FIG. 6 consisting of secondary

FIG. 5 shows a portion of the scan increment and position generator responsible for generating those functions needed for linearization of the scan increments. Pulses from the variable oscillator (not shown) are applied to one input AND circuit 81 in the function generator section 85 and to the pulse input P1 of shift register 83. With the shift register 83 set to ONE the output thereof is applied to a second input of AND circuit 81 which, with the application of two binary ONE signals applied to its inputs will produce a pulse from its output 87 which then is applied to the input of counter 89. Counter 89 comprises 12 stages of flip-flops which are set and reset in accordance to pulses applied thereto, a function which is well known to those familiar with the art. The outputs of the first 11 stages, stage 0 through stage 10 are applied to input circuitry of the multiplex circuit 91. The normal output of stage 10 of counter 89 is applied to gate amplifier 93 and the inverse output of stage 10 of the counter is applied to gate amplifier 95. The output of all the other stages of counter 89 are applied to the input of the multiplex circuit 91 through wires 101–120. For example, the normal outputs of stages 0, 1, and 2 are applied to the AND circuit 99 through wires 101, 102, and 106, respectively. The inverse outputs of stages 0, 1, and 2 are applied to AND circuit 121 through wires 104, 105, and 103, respectively. The normal outputs of stages 0 and 1 and the inverse output of stage 2 of counter 89 are applied to AND circuit 123 through wires 101, 102, and 103, respectively. The inverse outputs of stage 0 and stage 1 and the normal outputs of stage 2 of counter 89 are applied to AND circuit 125 through wires 104, 105, and 106, respectively. The function of AND circuits 99, 121, 123, and 125 is to provide logic switching for the multiplex input circuitry. The multiplex input circuitry 127 receives the normal outputs of stages 3–9 of the counter through wires 107, 109, 111, 113, 115, 117 and 119, respectively, while the inverse outputs of stages 3–9 of the counter 89 are applied to the multiplex input circuitry 127 through wires 108, 110, 112, 114, 116, 118, and 120, respectively. Combinations of signals on these inputs 101–120 cause output signals to be produced from the multiplex input circuitry 127 on output leads 131–146 which are applied to the logic circuitry 147 of function generator 85. Normally flip-flop 83 produces a binary ONE signal from its output 84 which is applied to a first input terminal of AND circuit 81. With pulses from the oscillator being applied to a second input terminal of AND circuit 81, this AND circuit will pass these pulses to its output 87 which connects to the input of counter 89 for as long as the binary ONE signal persists on the first input of AND circuit 81. When, however, a binary ZERO signal is applied to terminal OSO of flip-flop 83, resulting from a predetermined combination of binary ONE and binary ZERO signals, derived from the outputs 131–146 of multiplex circuit 91 and applied to logic circuitry 147, the flip-flop 83 is caused to produce a binary ZERO signal, which, when applied to the first input of AND circuit 81 will cause this circuit to inhibit the passage of pulses to the counter 89. However, the flip-flop is connected to reset itself to a binary ONE, following the first pulse that is inhibited.

The following is a description of operation during several consecutive pulses from the oscillator. A first pulse from the oscillator (not shown) is applied to one input of AND circuit 81, assuming that a binary ONE signal is applied to the other input of circuit 81 the pulse is passed onto the input of the counter 89 resulting in a change in the contents thereof which is reflected in the inputs 101–120, 151 and 153 of the multiplex circuit 91. The resultant signals from outputs 131–146 of the multiplex circuit 91 causes the logic circuitry 147 of the function generator 85 to produce a binary ZERO signal which is applied to terminal OSO of flip-flop 83. This binary ZERO signal steers flip-flop 83 to produce an output of a binary ZERO to be applied to AND circuit 81. However, the application of the binary ZERO signal is not performed until a second pulse from the oscillator (not shown) is applied to the pulse input P1 of the flip-flop 83. Upon the occurrence of this second pulse, flip-flop 83 produces a binary ZERO signal which is applied to the input of AND circuit 81. The second pulse is also applied to and passed by AND circuit 81 to the input of counter 89. The counter contents changes thereby causing a change in the input to multiplex circuit 91 resulting in a change in the output thereof, which when applied to the logic circuitry 147 of function generator 85 will cause a binary ONE to be applied to the OSO input of flip-flop 83. The flip-flop 83 is now steered to produce a binary ONE signal which upon the occurrence of the third pulse applied to pulse input P1 is applied to the input of AND circuit 81. However, upon the occurrence of the third pulse, AND circuit 81 still has a binary ZERO signal applied to one input and thereby is inhibited from passing this signal onto counter 89. The third pulse, however, will switch the flip-flop and cause a binary ONE signal to be applied to AND circuit 81, causing the fourth pulse therefore applied to input of circuit 81 to be passed onto counter 89. The deletion of one pulse from the oscillator has been accomplished by the arrangement of outputs of the multiplex circuit 91 in response to the contents of the counter 89, thus providing linearization of the scan increment cycle. The scan cycle and the frequency of the oscillator (not shown) cause stage 10 of the counter 89 to divide the entire scan cycle into four equal increments, two increments for the "see hot metal" period and two increments for an "off" period.

Figure 6A:
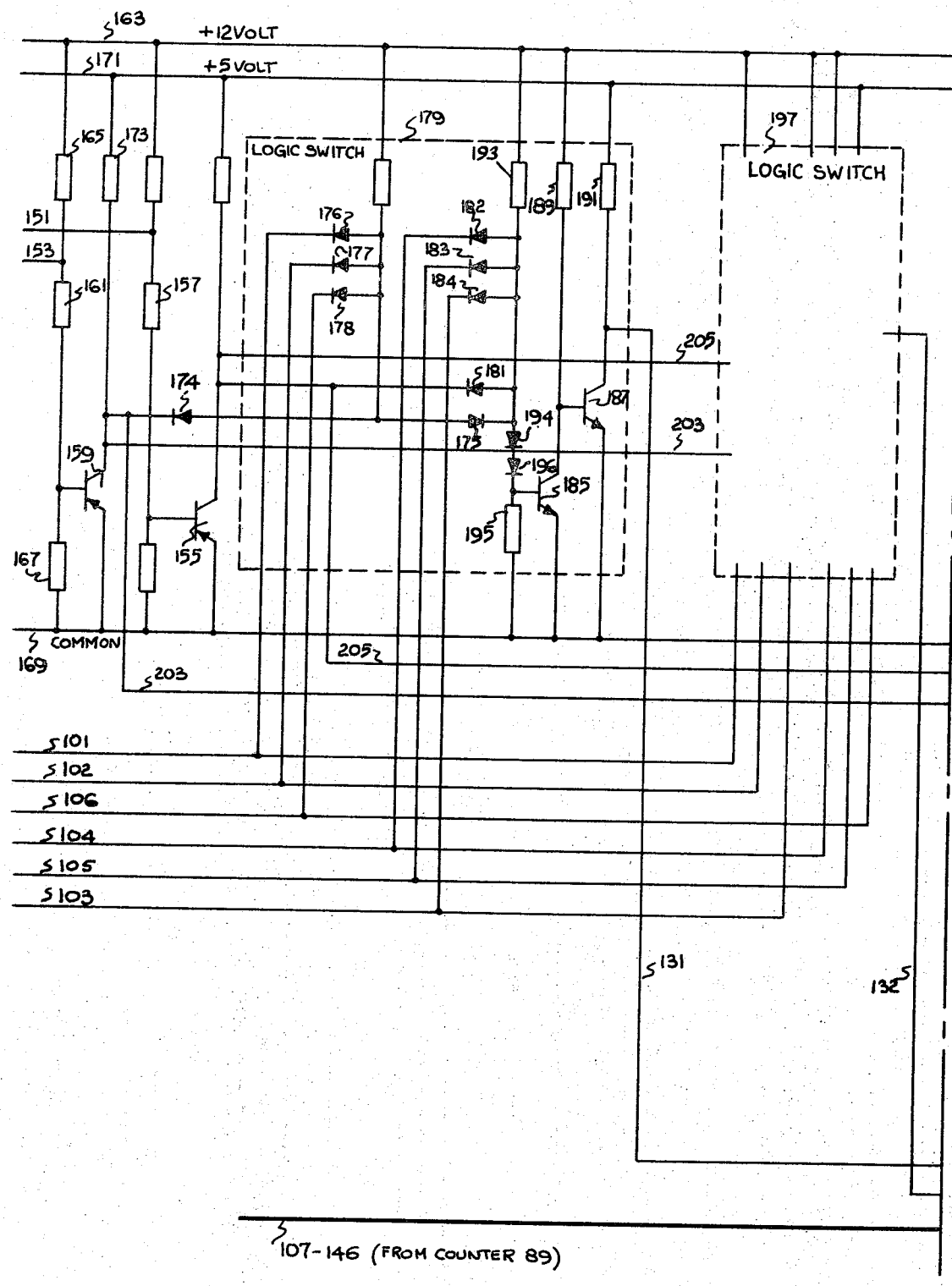
FIGS. 6A through 6G is a detailed diagram showing the electrical circuitry involved for the functional achievement shown in FIG. 5.
Figure 6B:
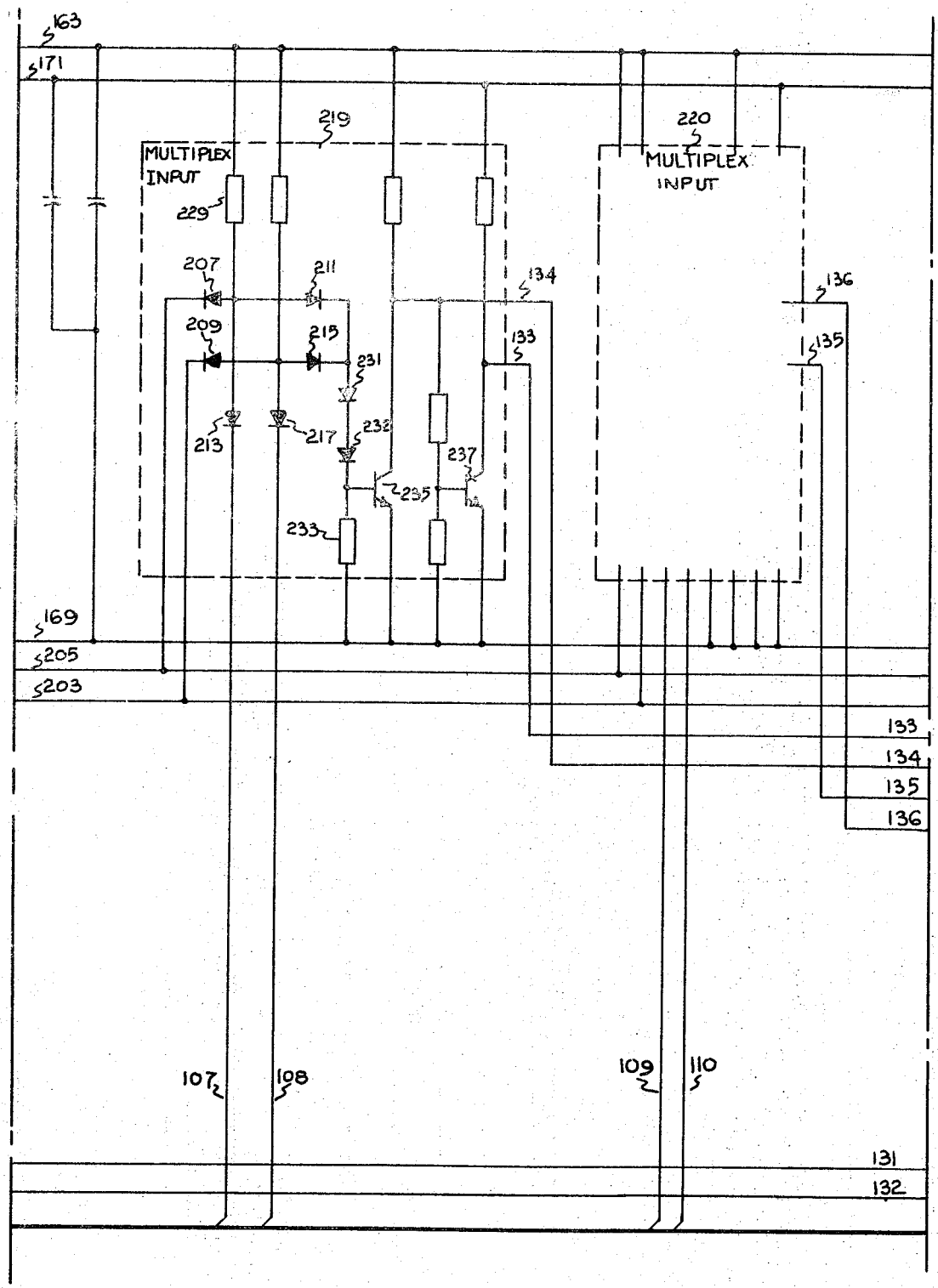
Figure 6C:
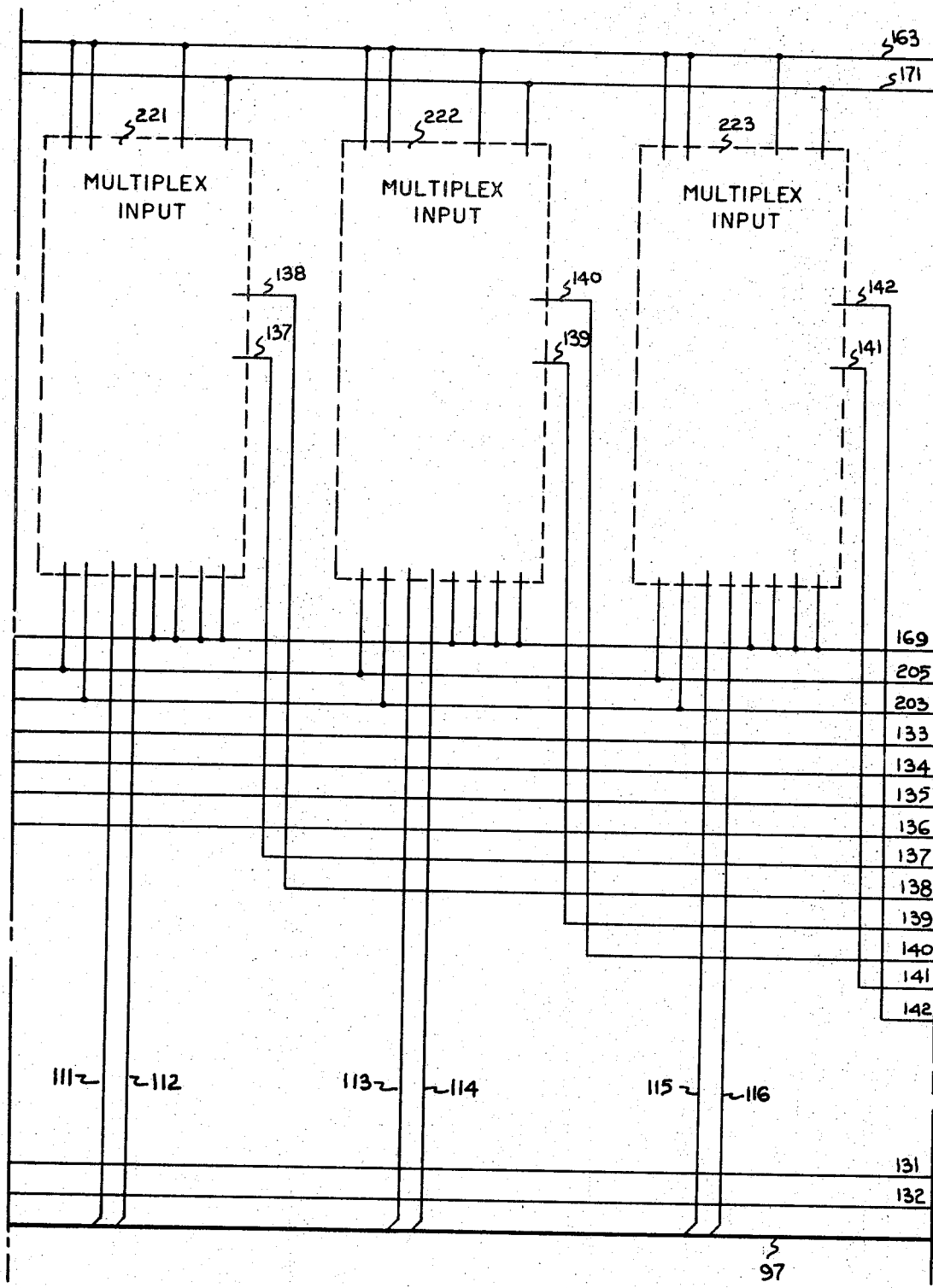
Figure 6D:
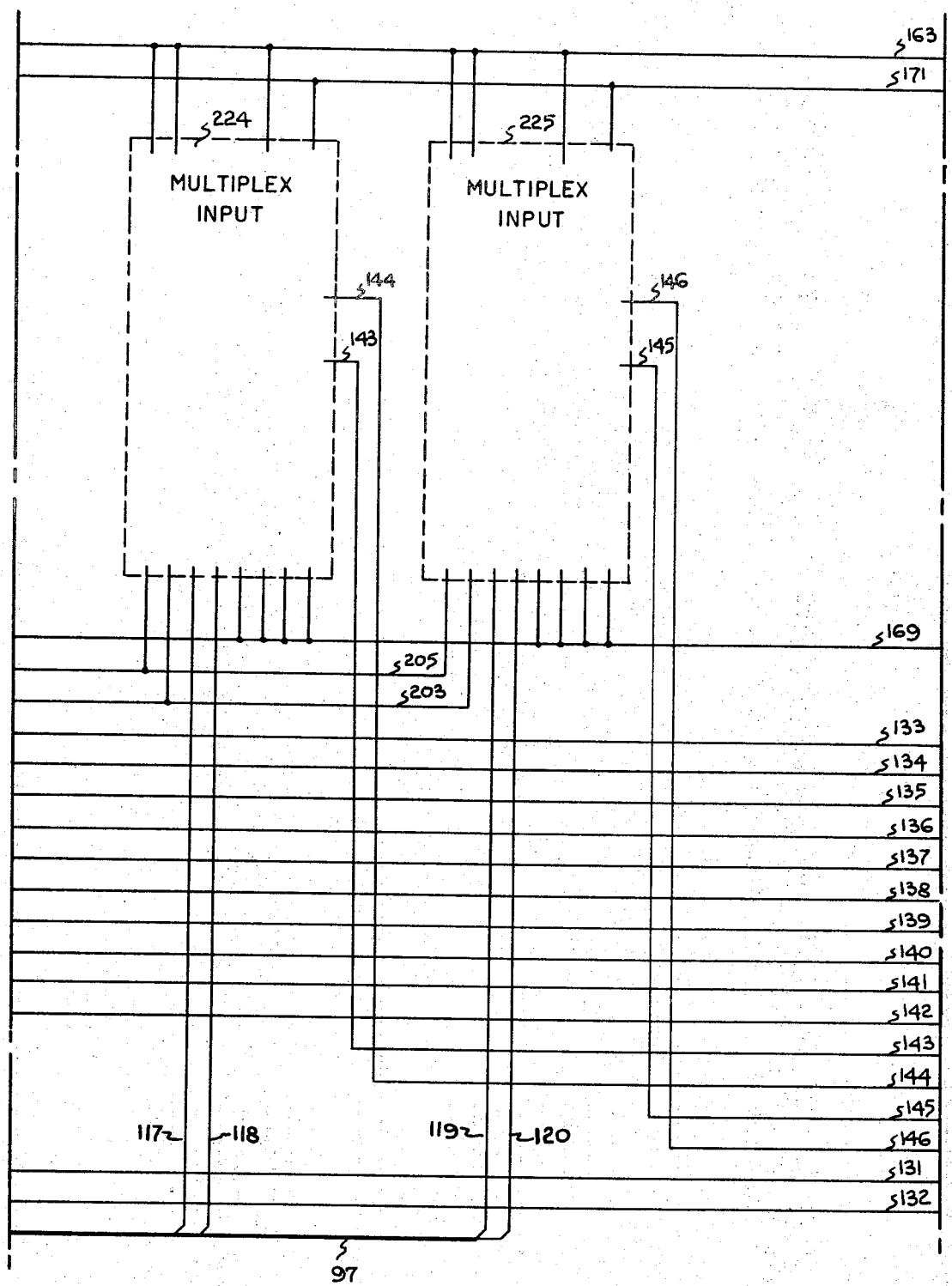

Referring now to FIGS. 6A and 6B representing the internal connections of multiplex circuit 91 shown in FIGS. 5 in FIG. 6A the normal output of stage 10 of counter 89 of FIG. 5 is applied to the base of transistor 155 through input 151 and resistor 157. The inverse output from stage 10 of counter 89 of FIG. 5 is applied to the base of transistor 159 through input 153 and resistor 161. Normally the transistor 159 is held in a conducting state by a voltage divider circuit formed by connecting a 12 volt bus 163 and resistors 165 and 161, which is connected to the base of transistor 159 and resistor 167 connected to a common bus 169. This represents a binary ONE input condition. A binary ZERO input condition holds the input 153 near zero volts, causing transistor 159 to become nonconducting. A 5 volt positive bus 171 is connected through resistor 173 to the collector of transistor 159 which has its emitter connected to the common bus 169. The collector of transistor 159 is connected to the cathode of diode 174, which has its anode connected to the anodes of diodes 175–178. This portion of the circuit containing transistors 155 and 159 and associated resistors and diodes form the gate amplifiers which are represented by numerals 93 and 95, respectively, in FIG. 5. In operation when a binary ONE signal derived from the inverse output of stage 10 of the counter 89 shown in FIG. 5 as applied through input 153 to the base of transistor 159 this transistor will turn on thereby connecting the cathode of diode 174 to common bus 169 which will cause the anode of 174 and the anodes of diodes 176–178 to assure a binary ZERO level. With the anodes of diodes 176–178 at a binary ZERO level, the cathodes are not affected in any way by the logic level of leads 101, 102, and 106, respectively. Under the conditions described above when the inverse output of stage 10 of the counter is at a binary ONE level, and the normal output of the tenth stage of the counter is at a binary ZERO level, transistor 155 is turned off. With transistor 155 turned off, its collector assumes the voltage of the +5 volt bus 171 which causes the cathode of diode 181 to be at 5 volts level. The anodes of diodes 181–184 then assume a voltage level which will cause the transistor 185 to conduct, subject to the condition of diodes 182–184 which are now under full control of inputs 103–105, since bringing the cathodes of any of the diodes 182–184 to 0 volts by connecting any one of leads 103–105 to the common bus 169 will cause transistor 185 to turn off by diverting the positive voltage away from its base. As a result, transistor 187 will conduct since its base now receives current from the positive 12 volt bus 163 through resistor 189.

Resistors 189 and 191 are connected to the collectors of transistors 185 and 187, respectively, thereby limiting the current through these transistors. Resistors 193 and 195 connected in series with each other and diodes 194 and 196 between the positive 12 volt bus and the common bus 169 form a voltage dividing circuit which provides voltage of such level to the base of transistor 185 to normally cause this transistor to turn on.

The circuit just described is logic switch portion of the multiplex circuit and represented by the AND circuits 99 and 121 in FIG. 5. A similar circuit shown as a block 197 in FIG. 6A is identical to circuitry of the logic switch 179 and is represented in FIG. 5 by AND circuits 123 and 125. Logic switch 197 is connected to gate amplifiers (collector of transistors 155 and 159) through wires 203 and 205 which perform the identical function as those connected into logic switch 179. Wires 101, 102, and 106 are connected to the normal outputs of stages 0, 1, and 2 of the counter and wires 104, 105, and 103 are connected to the inverse outputs of the 0, 1, and 2 stages of the counter. The function of the gate amplifiers therefore is to decide which of the groups of diodes such as 176–178 or 182–184 of logic switch 179 and a similar pair of groups in logic switch 197 will ultimately be influenced by the normal outputs and the inverse outputs of stages 0, 1, and 2 of the counter (not shown). The effect which the gate amplifiers therefore have over the accumulation of counts or pulses applied to the counter is that ultimately during the scan cycle the counter will alternately accumulate the signals from the normal and inverse outputs of the counter which produces the effect of down counting for two quarters of the cycle of the up count for the other two quarters of the cycle. The contents of the counter determines which of the diodes 176–178 will conduct and cause the output thereof to be produced from wire 131 of logic switch 179 and similarly which of the diodes 182–184 will cause an output to be produced from wire 131 of logic switch 179. A similar couple of sets of diodes will cause an output to be produced from wire 132 of logic switch 197. Wires 203 and 205 which are the outputs of the gate amplifiers are responsive to the condition of the normal and inverse outputs of stage 10 of the counter 98. When output 203 is at a binary ONE level, output 205 is at a binary ZERO level and inversely. Therefore, when the normal output of stage 10 of the counter is a binary ONE and as a consequence thereof transistor 155 is conducting, output 205 of the gate amplifier is at the binary ZERO level. Simultaneously, the inverse output of stage 10 of the counter will be at a binary ZERO level so that transistor 159 will be nonconducting, thereby causing output 203 to be at a +5 volt or a binary ONE level.

Referring now to FIG. 6B, outputs 205 and 203 are connected to the cathodes of diodes 207 and 209, respectively. The anode of diode 207 is connected to the anodes of diodes 211 and 213. Similarly, the anode of diode 209 is connected to the anodes of diodes 215 and 217. The cathode of diodes 213 and 217 connect to the normal and inverse output of stage 3 of the counter through wires 107 and 108, respectively. Assume now that due to the state of stage 10 of the counter, the output of the gate amplifier on FIG. 6A causes a binary ONE to be present on wire 205 and as a consequence a binary ZERO to be present on wire 203. With wire 203 at a binary ZERO, the cathode of diode 209 will be at a binary ZERO level and the anode of diode 217 will be at a binary ZERO. This provides a condition where an input applied to wire 107 is totally ineffective to this portion of the circuit. As previously stated, with wire 203 at ZERO level, wire 205 is at a binary ONE level. This binary ONE is applied to the cathode of diode 207 which as a consequence thereof permits the anodes of diodes 207 and 213 to assume a binary ONE level providing the cathode of diode 213 is at a binary ONE level. Wire 108 is now in full control over this portion of the circuit by being able to divert the voltage from the +12 volt bus 163 through resistor 229 to the counter. Wires 107 and 108 are connected to normal and inverse outputs of stage 3 of the counter which as a result control the level of the cathodes of diodes 211 and 215. Assume now that the state of stage 3 of the counter causes a binary ONE to be present on wire 108 which represents the inverse output of the counter. Then the anode of diode 211 and its cathode are at a binary ONE level which is applied to the base of transistor 235 through diodes 231 and 232. Transistor 235 now conducts and causes the output wire 134 of the multiplex input circuit 219 to go to binary ZERO level. The binary ZERO level from output wire 134 applied to the base of transistor 237 causes this transistor to become nonconducting thereby causing wire 133, the second output of multiplex input circuit 219, to assume the voltage level of bus 171, a binary ONE level. Should the state of stage 3 of the counter change so that wire 108 has a binary ZERO applied thereto the transistor 235 will turn off whereby a binary ONE is now applied to wire 134, an output of the multiplex input circuit 219, which causes transistor 237 to turn on, thereby causing a binary ZERO to be produced from the other output of multiplex input circuit 219 so that the outputs of the circuit are inverted from the previous state. Wires 205 and 203 connect to each of the multiplex input circuits 220–225 which internally have identical circuitry to multiplex input circuit 219. Multiplex input circuits 220–225 have their input connection wires 109–119 connected to the inverse and normal outputs of the counter stages 4–9, respectively. For instance, wire 109 connects to the normal output of stage 4 of the counter. Wire 110 connects to the inverse output of stage 4 of the counter. Wire 111 connects to the normal output of stages 5 of the counter while wire 112 connects to the inverse output of stage 5 of the counter. Similarly, wires 113, 115, 117, and 119 connect to the normal outputs of stages 6-9 of the counter, respectively, and wires 114, 116, 118 and 120 connect to the inverse outputs of stages 6-9 of the counter. Wires 107-119 are shown bundled in cable 97 and connected to the outputs of the counter 89 (not shown). The outputs 135-146 of multiplex input circuits 220-225 are identical to the outputs 133 and 134 of multiplex input circuit 219. For example, wires 135 and 136 carry the output signals of multiplex input circuits 220; and wires 137 and 138 connect to the output terminals of multiplex input circuits 221. Wires 139 and 140 are the outputs of multiplex input circuit 222. Similarly, wires 141-146 carry output signals of multiplex input circuits 222-225. Thus developed are series of connections 133-146 which carry the output signals of the multiplex circuits contained in FIGS. 6A-6D which are applied to the logic units of the function generator.

Figure 6E:
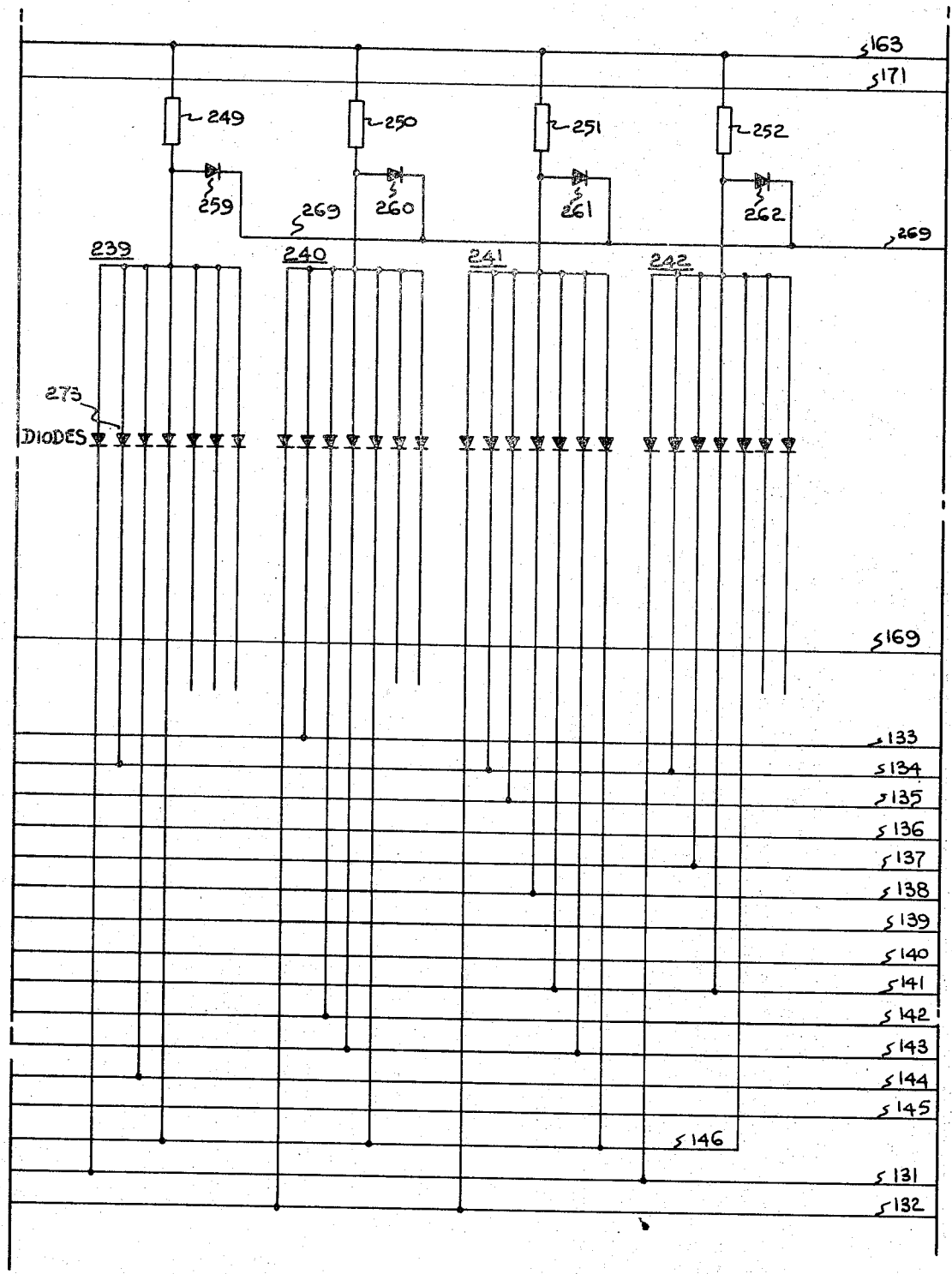
Figure 6F:
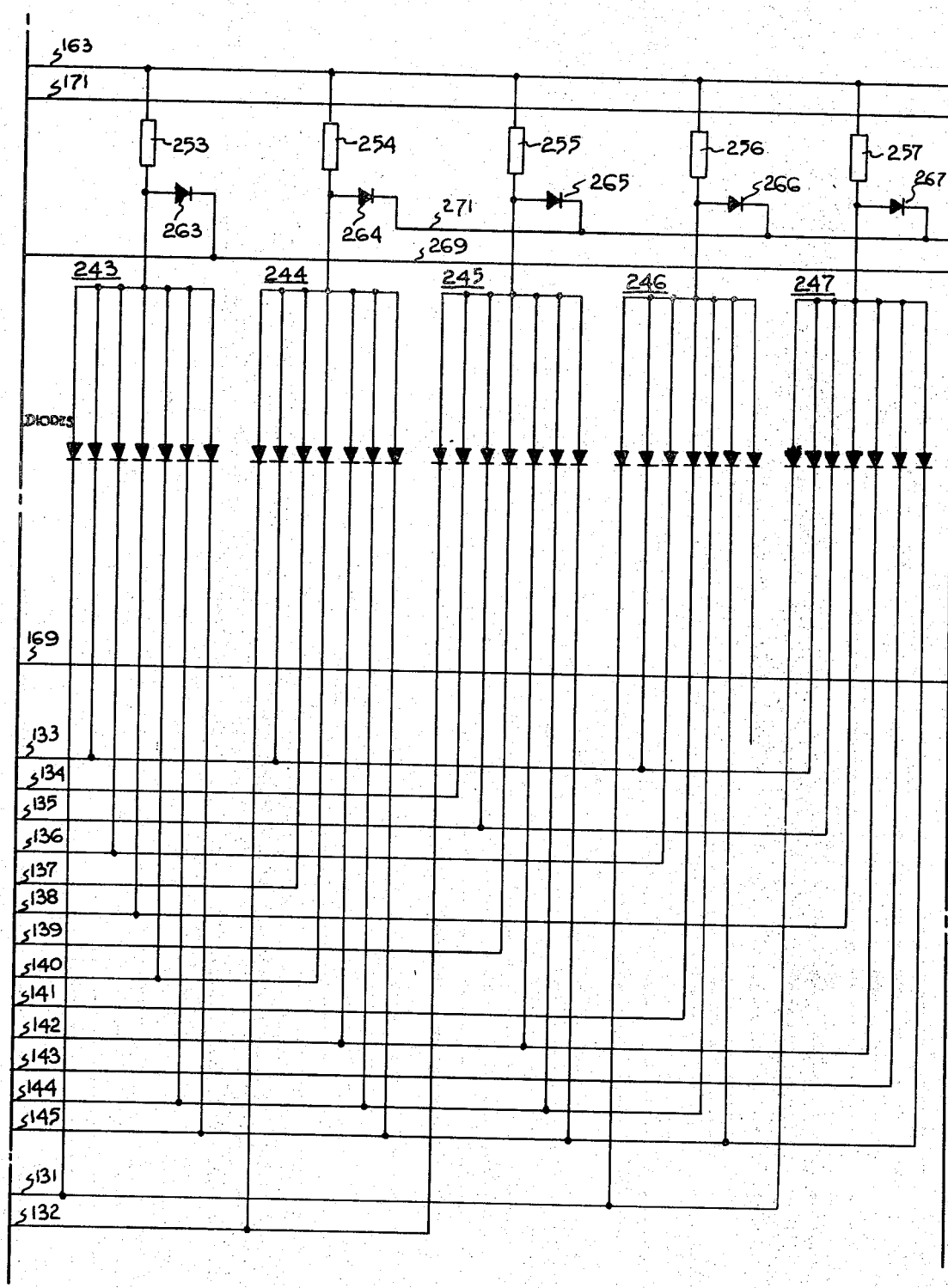
Figure 6G:
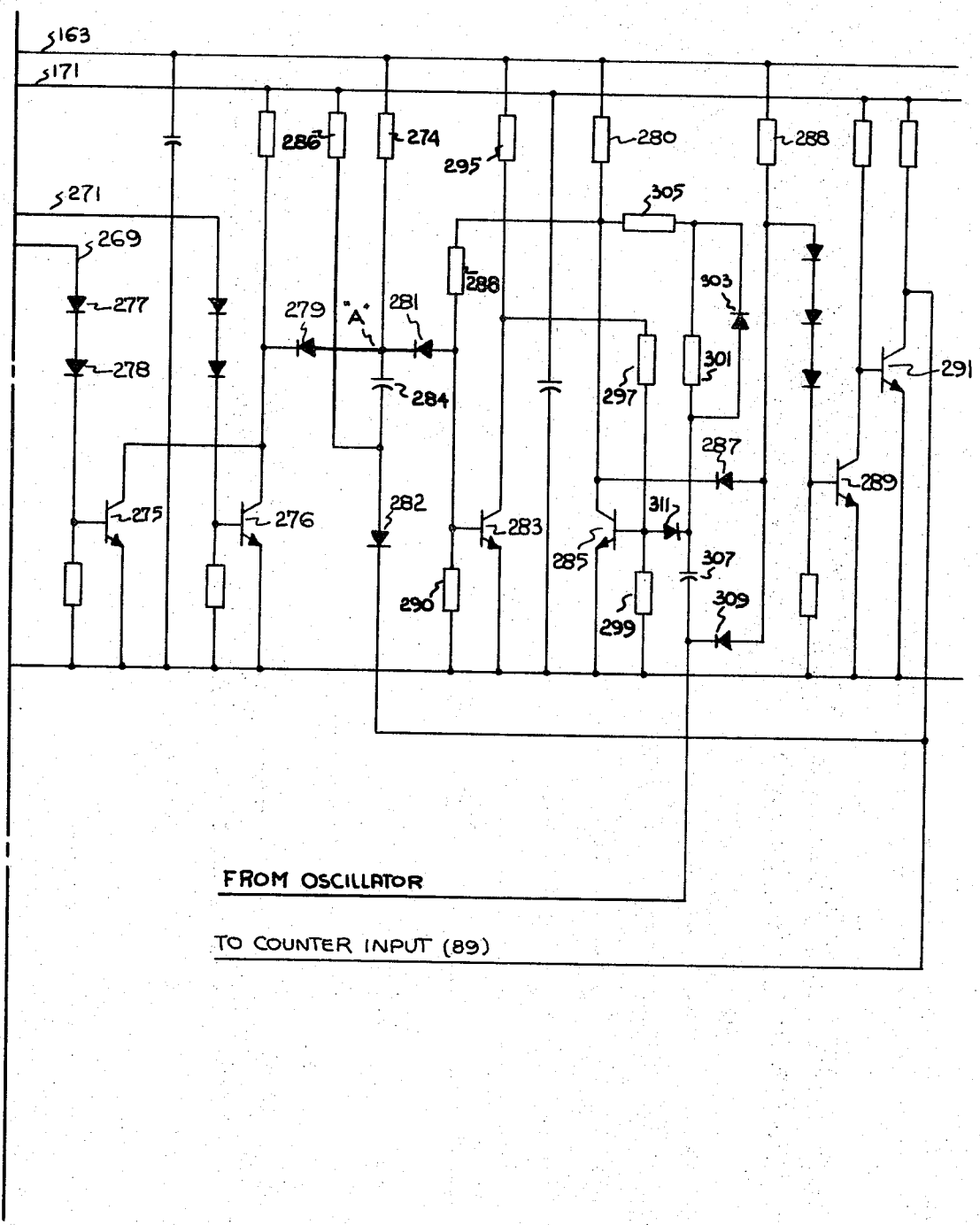

Referring now to FIGS. 6E and 6F showing the logic units 239-247 which in a predetermined manner connect to the outputs of the multiplex input circuits 219-225. The function generator has nine diode arrays 239-247 forming the function logic, each comprising seven diodes which have their anodes connected together and connected to the positive 12 volt bus 163 through a series of resistors 249-257. A series of diodes 259-263 each having its anode connected to the junction point of the anodes of the seven diodes of each array 239-243 have their cathodes connected to a bus 269. A series of diodes 264-267 each having their anodes connected to the junction points of diode arrays 244-247 have their cathodes connected to a bus 271. The cathodes of the diodes in the diode array are connected to a selective combination of multiplex output wires 131-146 which under certain conditions effect the state of busses 269 and 271. For example, in diode array 239 four of the diodes in the array are connected to leads 131, 134, 144, and 146, respectively. Assume now that a condition exists where lead 134 has a binary ZERO level signal applied thereto. With a binary ZERO applied to the cathode of diode 273, the anode of this diode will also be at the binary ZERO level, which in turn will cause the anode of diode 259 to be at a binary ZERO level. The cathode of diode 259, however, will be at a level which depends on the condition of all the other diode matrixes 240-247. If, for example, the diode array 239 was the only array in the circuit then under the condition where any one of the diodes of array 239 was conducting the anode and the cathode of diode 259 would be at a binary ZERO level, causing bus 269 to be at a binary ZERO level. Assume now that diode arrays 239 and 240 are the only diode arrays in the circuit and diode array 239 is in the condition described above and diode array 240 is in a condition where none of the diodes in the array are conducting. Then the anode of diode 260 will be at a binary ONE level. As a consequence thereof, the cathode of diode 260 and bus 269 will be at a binary ONE level. The identical condition arises when we add diode arrays 241-243 to the already mentioned diode arrays 239 and 240. If a condition exists in any one of the arrays 239-243 where none of its diodes are conducting, then the bus 269 will be at a binary ONE level. Similarly, the diode arrays 244-247 which are connected through diodes 264-267 to bus 271 if amongst any of these diode arrays one diode array is in such condition where none of its diodes are conducting the bus 271 will be at a binary ONE level. It follows therefore that at least one diode in each of the arrays 239-243 must be conducting for a binary ZERO to be present on bus 269. Similarly at least one diode in the diode arrays 244-247 will have to be conducting for a binary ZERO to be present on bus 271. Assume, therefore, that such is the case and bus 269 is at a binary ZERO level which is applied through diodes 277 and 278 to the base of transistor 275 (FIG. 6G). With a binary ZERO applied to its base, transistor 275 is in a noncon-ducting state, causing a binary ONE signal to be present at its collector, since the same condition exists on bus 271 driving the base of transistor 276 in a similar manner. This causes cathode of diode 279 to have a binary ONE applied thereto and since its anode is connected to the 12 volt bus resistor 274 it too has a binary ONE signal applied thereto.

So long as a binary ONE signal exists at the anode of diode 279, the capacitor 284 will be charged at its junction with resistor 274, the anode of diode 279 and the cathode of diode 281 to a voltage slightly in excess of +5 volts. Diode 282 has its anode connected to capacitor 284 and to resistor 286. The cathode of diode 282 is driven by the collector of transistor 291 to a +5 volts level. Therefore, when the cathode of diode 282 goes to a binary ZERO level through transistor 291, the junction of the anode of diode 282, resistor 286 and capacitor 284 will also go to binary ZERO, causing a differentiated negative-going signal to appear at the other end of capacitor 284. When transistor 291 produces a binary ONE signal at the cathode of diode 282, resistor 286 will cause junction of the anode of diode 282 to assume a binary ONE level, thereby recharging capacitor 284 for another differentiation operation of the next binary ZERO going signal from transistor 291. The anode of diode 282 swings between +5 volts and about one volt equal to the voltage drop across diode 282 and the collector to emitter voltage drop of transistor 291. Thus, as the collector of transistor 291 swings between binary ONE and ZERO states, approximately 4 volts differential will occur at the capacitor 284 junction with diode 282. This will produce a negative-going 4 volt differentiated signal at the other end of capacitor 284 on binary ZERO-going transitions from transistor 291. These differentiated signals are applied to the cathode of diode 281. Attention is now called to the anode of diode 281, connected to the base of transistor 283, can never be more than 0.8 volt positive even when transistor 283 is conducting. This is due to the clamping action of transistor 283 base diode on positive signals through the resistor bridge consisting of resistors 280, 288, and 290, applied to its base. Therefore, when a binary ONE signal on the cathode of diode 279 allows the junction A consisting of the anode of diode 279, resistor 274, capacitor 284, and the cathode of diode 281 to be charged to a positive 5 volts level, the negative going 4 volt differentiated signals produced at the junction through capacitor 284 will never cause diode 281 to conduct. Conversely, if the diode matrixes 239-247 cause binary ZERO to be applied to the cathode of diode 279, the anode thereof will pull the junction A down to about 1 volt positive, the negative-going 4 volt signals on junction A will cause diode 281 to conduct, transiently causing the current of the resistor bridge input to the base of transistor 283 to flow through diode 281 rather than transistor 281 base; thus providing a transient turn off signal to transistor 283.

Transistors 283 and 285 with associated supply and cross-connecting bridge resistors 295, 297 and 299 form a seal circuit (flip-flop). When transistor 283 is off, resistor 295, connected to its collector, supplies voltage from the +5 volt bus to the resistor bridge consisting of resistors 297 and 299 and to the base of transistor 285; this turns transistor 285 on to hold the base of transistor 283 at binary ZERO level, keeping transistor 283 in a nonconducting, sealing state and transistor 285 in a conducting state. When transistor 285 is off, the resistor connected to the collector thereof supplies voltage from +5 volts through the resistor bridge consisting of resistors 288 and 290 to the base of transistor 283, causing transistor 283 to conduct and thereby sealing transistor 283 on, and transistor 285 off in a similar manner.

For example, let transistor 283 be normally sealed on. Let a binary ONE signal occur on bus 269 or 271 and be applied to transistors 275 and 276 thereby causing transistor 275 or 276 to produce a binary ZERO signal which is applied to the cathode of diode 279. This will gate the next binary ZERO-going transition from transistor 291, causing diode 279 to turn transistor 283 off, thereby sealing transistor 285 on and 283 off. Simultaneously, the binary ZERO-going transition of the collector of transistor 291 is applied to the counter input, thereby changing the counter state and removing the condition which caused the binary ZERO-going signal to seal transistor 285 in the conducting state. With transistor 285 on, the resistor-diode network, consisting of resistors 297, 299, 301 and 305 and diodes 287, 303, and 309, and connected to the collector of transistor 285, gates capacitor 307 in a similar manner as diode 279 from transistors 275 and 276 gates capacitor 284; therefore, when collector 285 goes to ZERO, the succeeding binary ZERO-going transition from the oscillator applies a negative pulse through diode 311 to capacitor 307, thereby turning tarnsistor 285 off and sealing transistor 283 back to the conducting state.

Binary ONE to binary ZERO-going transitions from the oscillator (not shown) are applied through a diode to a resistor 288 connected to +12 volts. This resistor is also connected through three series diodes to the base of transistor 289. Current from resistor 288, flowing into the base of transistor 289, is diverted to flow into the oscillator through diode 309 when the oscillator output is a binary ZERO. Thus, transistor 289 will turn on and off in response to the binary ONE and binary ZERO signals from the oscillator. Transistor 289 inverts transistor 291 signals so that tranistor 291 output is at the same ONE and ZERO phasing as the oscillator signal. Therefore, when counter signals through the diode arrays 239–247 cause a ZERO input to diode 279, the next ZERO-going signal of the oscillator will cause transistor 291 to produce a binary ZERO, sealing transistor 285 on. In this state, diode 287 diverts current from resistor 288 into transistor 289 base, thereby holding transistor 291 at binary ZERO level for the following binary ZERO to binary ONE transition of the oscillator. During the following oscillator cycle, the binary ZERO-going transition of the oscillator will reseal transistor 285 in the nonconducting state whereby after the following cycle, transistor 191 will again be responsive to binary ONE to binary ZERO transition input from the oscillator.

From the aforegoing it can be seen that one of the logic circuits 239–247 under control of the leads 131–143 must be at a binary ONE level to create a condition in which a count to the counter 89 is eliminated. This condition occurs 41 times in each 1065 pulses applied to the counter during each quarter of the scan cycle.

Referring now to FIG. 3, the hot metal slab 11 is shown to be resting on rollers 15 of the runout table 13. Lines 301 and 303 represent the limits between which the scanning apparatus located at the junction point of 301 and 303 "sees" hot metal positioned on the runout table 13. Numeral 11a represents the outline of a slab of hot metal resting on rollers 15 of runout table 13 which falls within the identical limits indicated by lines 301 and 303 as does hot metal slab 11. Since the length measurement of hot metal slab is a function of the angle between lines 301 and 303, it would indicate that slabs 11 and 11a are of the identical measurement. It can be seen from FIG. 3 that this is not the case, therefore some compensation for thickness of the slab is necessary. Assume now that line 307 is the base line of the system which coincides with the top of the rolls 15 of the runout table 13 and on which the metal slabs 11 or 11a rest. The only time when the pulses produced by the function generator described in FIG. 6A–6G will be the exact number of pulses to fill the increments B, C, D, E, F, and G in FIG. 3 is at the base line 307. The true length of metal slab 11a is shorter than this distance and the true length of slab 11 is still shorter than that the length of the increments on line 307, yet lines 301 and 303 encompass them equally. Compensation, therefore, must be made for the thickness of the slab being processed. The compensation is derived by deleting pulses in the accumulation counter 59 in FIG. 2 as a function of the thickness of their metal slabs being processed. The apparatus performing this pulse deletion function is similar to that described in FIGS. 5 and 6 with the exception that the number of pulses deleted is linear throughout the range of thicknesses. In other words, there are a number of pulses which have to be dropped from the input to the accumulation counter 59 in FIG. 2 for slab 11a, FIG. 3. If slab 11 is six times as thick as slab 11a the number of pulses to be deleted from the input to the accumulation counter 59 in FIG. 2 will have to be six times as great as those being deleted for slab 11a. To perform this function the input signals, representing slab thickness, may be derived either from a computer, controlling the rolling process of the mill, or from a potentiometer (not shown) which is physically attached to the screws in the rolling mill (not shown) whereby the resistance in the potentiometer is a function of roll opening which is an indication of slab thickness. The signal derived from this potentiometer is applied to an analog to digital converter (not shown) which has its output applied to a function logic circuit similar to 147 in FIG. 5, except of simpler design since only a linear proportion of pulses need to be dropped. Under certain conditions this function logic will produce a binary ONE signal which then is applied to the OSO input of a flip-flop similar to flip-flop 83 in FIG. 5 which in turn controls the output of an AND circuit similar to AND circuit 81 thereby controlling the input to a counter equivalent to counter 89 in FIG. 5. Depending on the input to the function logic circuit, the flip-flop will cause the AND circuit to either pass or inhibit the pulse to the counter input.

A similar arrangement is necessary for compensation of the position of the scanning equipment above the runout table. In FIG. 3 let J be the position of the scanning apparatus above the runout table 13. The distance between point J and the line 307 representing the top of the rolls 15 of the runout table 13 is a determining factor in the total accumulated length of increments A–H. For example, if point J was closer to a line 307 the total accumulated length of increments A–H would be less than as shown in FIG. 3. Therefore, compensation is necessary to produce a quantity of pulses which truly represent the length of the metal slab as a function of position of the scanner at point J. This is performed by an identical circuit described for compensation as a function of thickness of slab with the exception that the adjustment is made at the time of installation and need not be adjustable once the equipment is installed unless a change in position of the scanner is anticipated.

While there has been described at present what is thought to be the preferred embodiment of the invention, variations and modifications may occur to those skilled in the art. Therefore, it is intended that the appended claims shall be construed to include all such variations and modifications as fall within the true spirit and scope of the invention.

What is claimed is:

1. A noncontacting gage for measuring the dimensions of a hot metal object including: scanning means responsive to the infrared radiation of the hot object for producing an electrical signal, means for fragmenting said signal into equilength increments, and means for accumulating said increments and displaying said accumulation representative of the linear measurement of the hot object.

2. The noncontacting gage claimed in claim 1 wherein said fragmenting means includes: an oscillator, gating means for producing a pulsed output in response to input signals from said scanning means and said oscillator, and means for linearization of the number of pulses of said pulsed output as a function of said scanning means.

3. Apparatus for measuring a planar dimension of a radiant object comprising a polygonal, rotatable mirror, an infrared sensor, means for rotating said mirror to scan said object along said dimension for producing signals in said sensor corresponding to equiangular segments of rotation, means for linearizing said signals as projections in the plane of said dimension, and means for accumulating said linearized signals in summation as a representation of the magnitude of said dimension.

4. The invention of claim 3 with the further provision of means for determining the real plane of projection in accordance with the depth of scanning in respect to linearizing said signals.

5. The invention of claim 4 with the further provision of a function generator for providing said linearizing means and a decimal counter having a zoned binary level under control of said generator to drive a predetermined number of multiplexing circuits whereby the said signals are limited.

6. The invention of claim 5 with the further modification of a logic circuit mixer for algebraically withholding signals from said counter whereby the number of signals linearized is reduced.

7. Apparatus for measuring a dimension in a distant plane including means for scanning said dimension, a function generator controlled by said scanning means, said generator having a predetermined rate of producing pulses, means for altering said rate in accordance with nonplanar deviations of said scanning means, and means for evaluating the sum of said pulses as a measure of said dimension.

8. The invention of claim 7 with the further provision of scanning means having an angular displacement and having said generator controlled by projections of said displacement in said plane.

9. The invention of claim 7 in which said scanning means provides a succession of integrated, angular displacements and said generator is controlled by derivatives of said displacements upon said plane.

10. The invention according to claim 9 with the further provision of means for multiplexing said derivatives when the latter become repetitive.

References Cited

UNITED STATES PATENTS 3,248,734  4/1966  Weiss et al.
3,355,591  11/1967  Pfister.
3,396,278  8/1968  Hjorth.

ARCHIE R. BORCHELT, Primary Examiner

U.S. Cl. X.R.

250—219